United States Patent [19]
Dowden et al.

[11] Patent Number: 5,181,237
[45] Date of Patent: Jan. 19, 1993

[54] AUTOMATION OF TELEPHONE OPERATOR ASSISTANCE CALLS

[75] Inventors: Douglas C. Dowden; Richard W. Hemmeter, both of Naperville; Diane E. Herr, Warrenville, all of Ill.; William K. McCormick, Chester; Robert Petrelli, East Brunswick, both of N.J.; Richard J. Piereth, Naperville, Ill.; Samuel M. Salchenberger, Elmhurst, Ill.; Chander S. Sehgal, Naperville, Ill.; Mahendra K. Verma, Marlboro, N.J.

[73] Assignee: AT&T Bell Laboratories, Murray Hill, N.J.

[21] Appl. No.: 675,779

[22] Filed: Mar. 27, 1991

Related U.S. Application Data

[63] Continuation-in-part of Ser. No. 596,809, Oct. 12, 1990.

[51] Int. Cl.⁵ .............. H04M 3/50; H04M 7/00; H04Q 3/72
[52] U.S. Cl. .............. 379/88; 379/212; 379/213; 379/223; 379/246
[58] Field of Search .............. 379/67, 88, 89, 213, 379/214, 212, 216, 223, 245, 246, 247

[56] References Cited

U.S. PATENT DOCUMENTS

| | | | |
|---|---|---|---|
| 4,644,107 | 2/1987 | Clowes et al. | 379/354 |
| 4,827,500 | 5/1989 | Binkerd et al. | 379/88 |
| 4,837,804 | 6/1989 | Akita | 379/88 |
| 4,852,149 | 7/1989 | Zwick et al. | 379/67 |
| 4,853,953 | 8/1989 | Fujisaki | 379/88 |
| 4,896,346 | 1/1990 | Belfield et al. | 379/88 |
| 4,899,373 | 2/1990 | Lee et al. | 379/207 |
| 4,932,042 | 6/1990 | Baral et al. | 379/67 |

FOREIGN PATENT DOCUMENTS

| | | |
|---|---|---|
| 0105441 | 4/1984 | European Pat. Off. |
| 0181356 | 10/1983 | Japan .............. 379/88 |

OTHER PUBLICATIONS

"Conversant 1 Voice System: Architecture and Applications", R. J. Perdue et al., *AT&T Tech. Jour.*, vol. 65, No. 5, Sep./Oct. 1986, pp. 34–47.

"A Voice Password System for Access Security", M. Birnbaum et al., *AT&T Tech. Jour.*, vol. 65, No. 5, Sep./Oct. 1986, pp. 68–74.

"MCI's ANI-Changing the Way We Shop", H. Newton, *Teleconnect*, Aug. 1989, pp. 122, 123, 126.

"Talking Data", P. Kneisel, *Inbound/Outbound Magazine*, Oct. 1989, pp. 24–28.

*Primary Examiner*—Thomas W. Brown
*Attorney, Agent, or Firm*—Werner Ulrich

[57] ABSTRACT

This invention relates to methods and apparatus for automatically processing operator assistance calls. A caller is connected to an automated operator position. The automated position has speech recognition facilities to replace those of an operator, has announcement capabilities to replace those of an operator, and has control apparatus for transmitting and receiving the same set of messages transmitted and received by an operator position. Advantageously, the operator assistance switch has the same interface to an automated position as to an operator position and interacts with the two identically. Since the capabilities of the automated position are limited by its program, the automated position switches a call to an automated position when a situation occurs for which it has not been programmed. Advantageously, a switch need not be specially programmed to communicate with an automated position. Advantageously, new operator assistance services can be provided automatically without rewriting the complex control software of the switch. The invention further relates to the use of automated operator positions for providing spontaneous voice message service wherein a caller converts a call to a message call if the called party does not answer or is busy, and to a method of recognizing a voice specified destination and establishing a call to that destination.

11 Claims, 6 Drawing Sheets

CALL DELIVERY

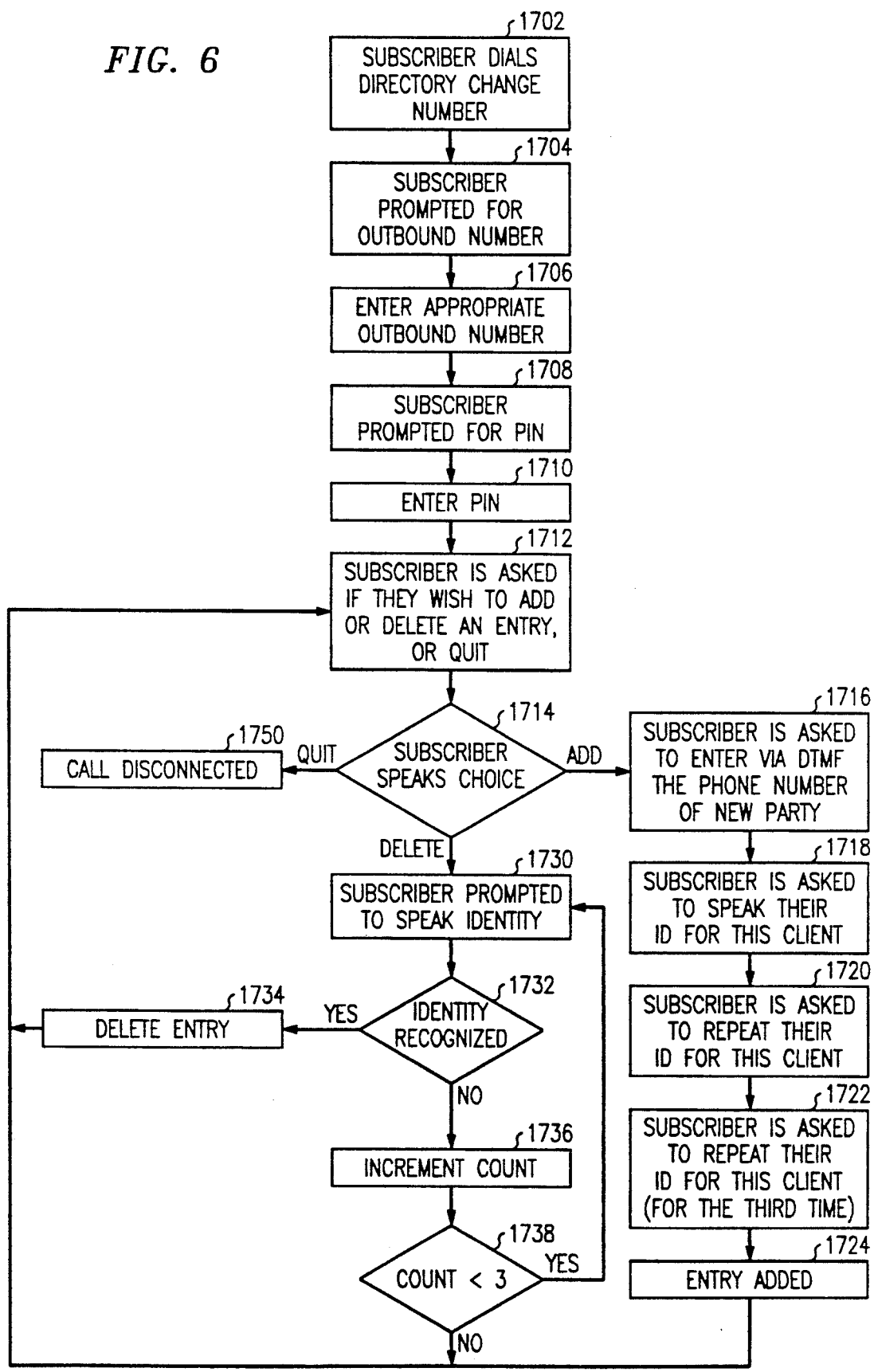

AUTOMATION OF TELEPHONE OPERATOR ASSISTANCE CALLS

CROSS-REFERENCE TO RELATED APPLICATION

This application relates to an application by Douglas C. Dowden, Richard W. Hemmeter, Diane E. Herr, W. K. McCormick, Robert Petrelli, Richard J. Piereth, Samuel M. Salchenberger, Chander S. Sehgal, and Mahendra K. Verma entitled "Automation Of Telephone Operator Assistance Calls", Ser. No. 07/675,783 concurrently filed herewith and assigned to the same assignee as this application.

This application is a continuation-in-part of: Douglas C. Dowden, Richard W. Hemmeter, Diane E. Herr, Richard J. Piereth, Samuel M. Salchenberger, Chander S. Sehgal, and Mahendra K. Verma entitled "Automation of Telephone Operator Assistance Calls", Ser. No. 596,809, filed Oct. 12, 1990, an application assigned to an assignee of the present application.

TECHNICAL FIELD

This invention relates to methods and apparatus for automating the processing of operator assistance type telecommunications calls.

PROBLEM

Over the past several decades, a great deal of toll telephone traffic which used to be handled by operators has been automated. The initial step of automating what was originally operator assistance traffic was to offer customer-dialed long distance call service. Then, customer-dialed operator assistance calls were introduced to permit operators to process calls for which the number had already been dialed. Automatic recording of telephone charges was introduced also at that time. Today, the category of fully or partially automated operator assistance telephone traffic includes coin calls, calling card calls, automatic quotation of charges for hotel guest originated calls, and partial automation of collect and person calls. In spite of the intensive effort to automate operator assistance calls, telephone companies annually spent over a billion dollars for operator wages and accompanying overhead costs.

Operator assisted calls are processed from attended operator positions attached to operator assistance switching systems or switches. These switches are operated under the control of a complex program, generally referred to as a generic program, which must be tested very carefully to ensure that no program flaws remain that could cause a system to "crash" or become non-functional. The switch communicates with operator positions by data messages used to operate displays at the operator position, and to transmit information keyed by the operator, in response to instructions from the caller, to the switch. The generic program is designed carefully to ensure that poor data received from an operator switch does not affect more than one call. A problem in such switches is that it is difficult to introduce new services and to automate operator functions because of the difficulty of changing the generic program.

In A. N. Daudelin, U.S. Pat. No. 4,797,910, a speech recognition unit that is a part of an operator assistance switch is used to determine a call type, and cooperate in the automatic establishment of the call. When the called party answers on a collect call, the speech recognition unit determines whether the called customer accepts the call.

A problem of the prior art relates to automatic dialing of frequently dialed telephone numbers. This need is served by customer station equipment in which these frequently dialed numbers can be preset or in telephone central office arrangements which, in response to an abbreviated identification, establish a call to a prespecified destination. In both cases, the arrangements are operative only when the customer dials from his or her home or office telephone or from a mobile phone which has been preprogrammed with the desired telephone numbers.

SOLUTION

The above problem is solved and an advance is made over the prior art in accordance with the principles of our invention wherein an unattended automated position is substituted for some of the operator positions attached to an operator assistance switch; such an automated position includes means for recognizing commands such as speech commands, for making announcements to a connected telephone customer, and optionally, for detecting DTMF digits, for recording speech, and for detecting a switch-hook "flash" (i.e., a brief depression of the switch-hook). In one preferred embodiment, the interface between the operator position and the operator assistance switching system is maintained for the automated position so that the existing data communications in both directions are the same. The assistance switching system communicates with the positions using the same messages for generating displays at the operator position and the automated position. Similarly, the automated position communicates with the switching system using the same messages used by the operator position for controlling switching system operations. If an automated position cannot process a particular call, either because the call type is not anticipated in the program controlling the automated position, or because the automated position cannot recognize the caller's speech, the automated position sends a data message to the switch asking that the call be switched to an attended operator position. Advantageously, the switching system has already been designed to react in a safe manner to any combination of control signals from the operator position so that the amount of damage inflicted on other calls as a result of improper performance by an automated position is highly restricted.

The automated position can access a remote database in essentially the same way that an operator position does. The automated position sends the same kinds of messages and performs the same kind of data interpretation of the return message as is performed by an operator at a conventional operator position.

The problem of providing a simplified arrangement for dialing frequently called numbers, when the caller is away from his home or office or is using a mobile phone that has not been programmed with the appropriate numbers, is solved by connecting the caller to automated position means for recognizing a spoken command from the caller. These spoken commands are individually recorded for each caller and the commands are compared only with the command previously recorded for that caller. Advantageously, a connection is set up to a prespecified number in response to a spoken command from the caller. The number which is used for accessing the caller's repertory of spoken commands may be preprogrammed into a mobile telephone unit so that commands which are recorded from the customer so that access to the appropriate voice recognition system is simplified. Advantageously, such an arrangement allows a caller, such as a busy attorney with frequent changes of clients, to record the telephone numbers of his or her current clients and to access these clients while away from home without having to remember their telephone numbers.

BRIEF DESCRIPTION OF THE DRAWING

FIGS. 3-6 are flow diagrams of a method for offering spontaneous voice messaging service and a simplified arrangement for dialing frequently called numbers in conformance with the principles of this invention.

DETAILED DESCRIPTION

Figure 1:
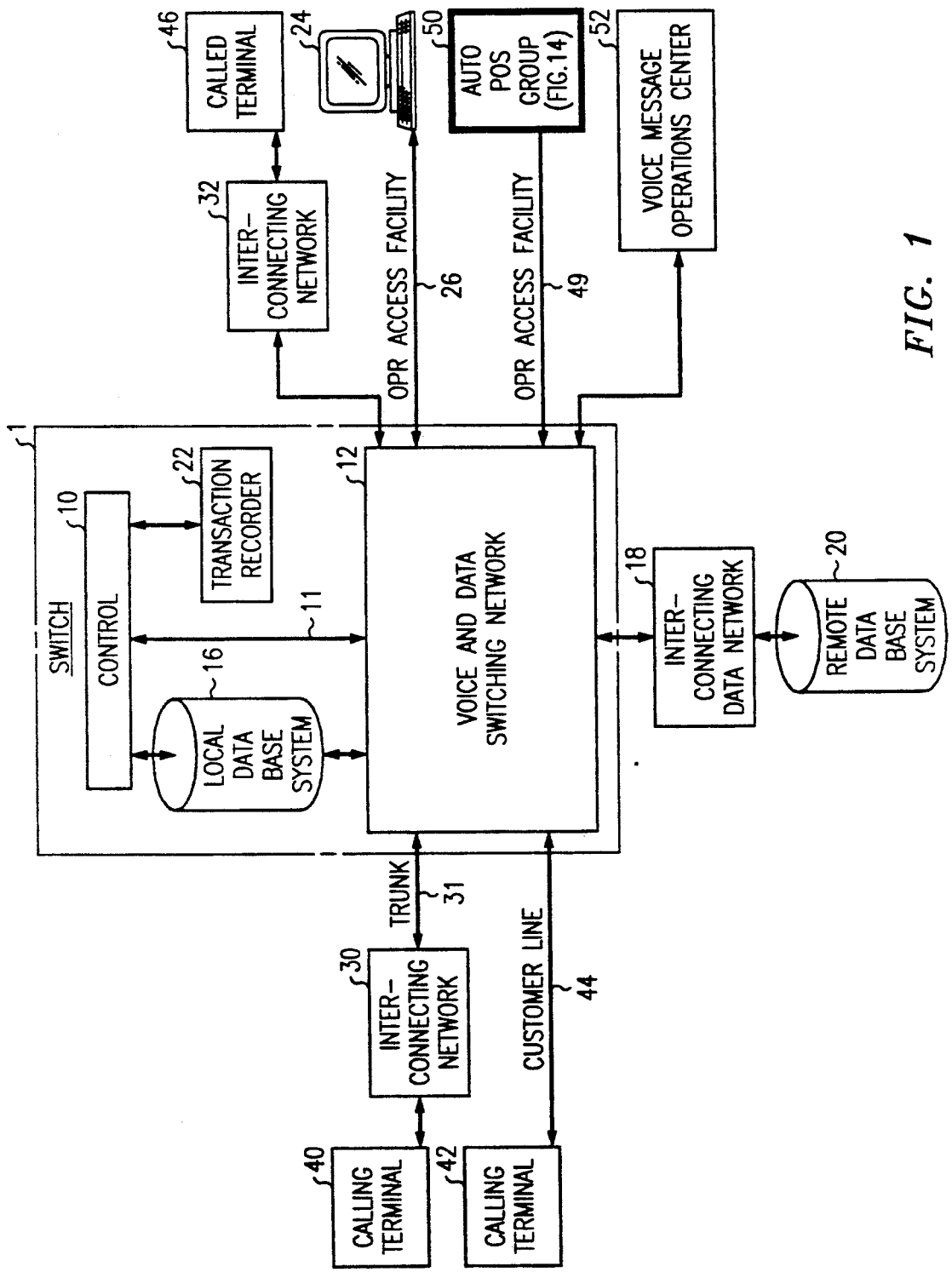
FIG. 1 is an overall block diagram of an operator assistance switch and a connected operator position and automated position group.

The principles of the present invention may be understood by examining an exemplary embodiment. FIG. 1 is a block diagram of a system arranged to incorporate the present invention. The novel portion of FIG. 1 is an automated position group, block 50, shown in heavy outline and expanded in FIG. 2. Block 1 represents a telecommunications switch operating under stored program control and having within it the elements necessary for practicing the invention. Switch 1 is a switch such as the 5ESS switch manufactured by AT&T Technologies, Inc., arranged to offer the Operator Services Position System (OSPS) features. The 5ESS switch is described, for example, in *AT&T Technical Journal*, v. 64, no. 6, part 2, pp. 1305-1564, and the OSPS feature is described, for example, in Paper 3, Session 22C presented at the International Switching Symposium in May, 1984.

Within switch 1 are various blocks for carrying out the functions of a telecommunications switch. Control 10 is a distributed control system operating under the control of a group of data and call processing programs to control various blocks of the switch. In order to practice the present invention, the operator services control programs must be augmented by programs described in the flow charts of FIGS. 3-6. Control 10 is used to control operations of switch 1. Block 12 is a voice and data switching network capable of switching voice and/or data between inputs connected to the switching network.

In this embodiment, network 12 has integrated voice/data outputs in the Integrated Services Digital Network (ISDN) format. The switch communicates with operator positions over an ISDN connection with a Basic Rate Interface (BRI) for communicating two B-channels (64 kbit/second (kb/s)) and one D-channel (16 kb/s). The B-channels are used for voice signals in this embodiment. Connected to the switch are a conventional operator position 24, attended by a human operator, and automated position group 50, shown in detail in FIG. 2. The automated position group 50 serves four simultaneous calls and includes facilites for performing voice processing. The voice processing arrangement receives an input signal which may be either voice or a dual tone multifrequency (DTMF) signal and has the capability for analyzing that signal to distinguish among the various allowable DTMF signals and among the individual elements of a predetermined list of spoken responses. The voice processing arrangement also generates tones and voice messages to prompt a customer to speak or key information into the system for subsequent recognition by the voice processing unit. In addition, the voice processing unit has the capability for recording a short customer response, typically, a name, for subsequent playback to a called terminal. These recordings may also be saved for subsequent use in fraud detection. For example, evidence can be accumulated for stations with a high propensity for fraud. Within the automated position group, the voice processing arrangement generates an output data message, representing the result of the voice processing; this output message is used as an input to a program in the automated position group for controlling the generation of position messages to the switch 10. In response, the switch controls the establishment of connections in switching network 12 and generates display data for the automated position 50. The Conversant ® Voice Information System, manufactured by AT&T Technologies, Inc., is one unit which can be used to carry out the functions of the voice processing arrangement.

Two types of data systems are used by switch 1 in order to set up operator assistance calls in conformance with the principles of this invention. Local data base system 16 is directly accessible by control 10 of switch 1 via switching network 12. Remote data base system 20 is accessible to control 10 of switch 1 via switching network 12 and an interconnecting data network 18. A remote data base system is typically used for storing data that is shared by many switches. For example, a remote data base system might store data pertaining to customers for a region; the particular remote data base system that is accessed via data network 18 would be selected to be the remote data base system associated with the region of the called terminal. Interconnecting data network 18 can be any well known data network and specifically could be a common channel signaling system such as the international standard telecommunications signaling system CCS 7.

Transaction recorder 22 is used for recording data about calls for subsequent processing. This data typically is billing data which is subsequently sent over a data link to be processed by a billing processor in order to prepare customer bills. The transaction recorder is also used for recording traffic data in order to engineer additions properly and in order to control traffic dynamically.

Operator position 24 connected to switch 1 comprises a terminal for use by an operator in order to control operator assistance calls. Data displays for the terminal of operator position 24 are generated by control 10. Operator position 24 is connected to the voice and data switching network 12 by operator access facility 26 which may include carrier facilities in order to allow the operator position to be located remotely from switching network 12. Alternatively, operator access facility 26 may be a simple voice and data access facility if the operator positions are located in close physical proximity to the switching network. Only one operator position is shown in FIG. 1 but it is understood that a typical switch, arranged to offer operator assistance services, has access to a large number of such operator positions.

It is often desirable that certain kinds of operator functions be assigned to specialized teams. One example is Spanish-speaking operators who could be accessed by customers with English language difficulties whose native language is Spanish. Another example is operators who have access to the special facilities required for setting up conference calls. Still another example is operators from a customer credit and service bureau who have access to customer billing records who can handle customer requests for billing information and for credit in case a customer reached a wrong number. In order to access the proper one of these operator teams, a customer's spoken command, or, in the case of a customer with a DTMF terminal, a keyed command code is used. In some cases (not shown in FIG. 1) specialized teams may be attached to a different switch in which case an interconnecting network is used to connect the originating customer to that switch for connection to an operator from an appropriate operator team.

Connected to switch 1 are interconnecting networks 30 and 32. These are networks which may include one or more switches and which are used for interconnecting voice and data signals between customer terminals and switch 1. Also connected to switch 1 are customer lines, including customer line 44, for connecting a calling terminal 42 to switch 1. The word "terminal" as used herein includes a simple customer telephone station, a customer station with more elaborate features such as magnetic stripe card readers, or a customer voice/data terminal. Calling terminal 40 is connected through interconnecting network 30 to switch 1. In this specific example, calling terminal 40 is connected by a customer line to a 1AESS switch and that switch is connected to trunk 31 which is connected to switch 1. For the sake of clarity, a separate interconnecting network 32 is shown as being interposed between switch 1 and called terminal 46. In practice, interconnecting networks 30 and 32 are parts of a much larger common carrier network. In the example call described below, interconnecting network 32 contains different switches from interconnecting network 30. Called terminal 46 is connected to interconnecting network 32 and via that network can be accessed by switch 1. If the calling terminal is not directly connected to switch 1, the directory number of the calling terminal, identified, for example, by automatic number identification, is transmitted from the switch connected to the calling terminal to switch 1.

The term "operator assistance call" as used herein also refers to calls some of which are already automated. For example, Automated Calling Card Service (ACCS) has made it possible for customers having a DTMF terminal to place a calling card call without requiring the services of an operator. As discussed hereinafter, other classes of operator assistance calls may also no longer require the service of an operator according to the principles of this invention. Thus, the term "operator assistance call" refers to those classes of calls which have in the past usually required the service of an operator, such as those which are dialed with an initial digit 0.

In order to illustrate the basic principles of the invention, a simple collect call from calling terminal 42 to called terminal 46 will be described. The customer at a calling terminal is referred to as a calling customer or caller. In this example, the called customer at terminal 46 has agreed ahead of time to accept collect calls but wishes to be informed when an incoming call is a collect call. The caller at terminal 42 dials or keys 0, followed by the directory number of called terminal 46. This number which is dialed over customer line 44 is received in voice and data switching network 12 and passed to control 10 via control access 11. Control 10 analyzes this dialed (using a dial terminal) or keyed (using a DTMF terminal) number and recognizes that calling terminal 42 has placed some kind of operator assistance call. In order to determine whether this is a calling card, third number (third), person-to-person (person), collect, Spanish-speaking (Spanish), conference, billing or other operator assistance call, it is necessary to connect the calling customer at terminal 42 to a port of automated position group 50. After this connection has been established, automated position group 50 returns a (prompting) tone to calling terminal 42. In response to this tone, if the calling customer at terminal 42 has a DTMF telecommunications terminal, the customer will dial a two-digit command code identifying the class of the call to be placed as a collect call. If the calling customer does not have a DTMF terminal or chooses to speak, then the customer can speak one of the allowed call type phrases such as: collect, calling card, person, third number, operator, espanol (to request a Spanish-speaking operator), conference, or billing, and, in this case, will say "Collect". If the calling customer fails to key in the command code or to speak the command, he or she will be prompted by an announcement which says: "Please say collect, calling card, person, third number, espanol, conference, billing, or operator now." The keyed command code, or the spoken command is analyzed by automated position group 50 which determines that a collect call is to be set up. The tone or announcement is used to prompt the calling customer to give the requested response. After a time, only the tone may be required since customers will learn to interpret the tone as a prompting signal. To reassure the calling customer, that customer receives an announcement from voice processing unit 1405 (FIG. 2) of automated position group 50, while the call is being set up, to indicate that a collect call is being set up from his terminal to the called customer.

A connection is then set up through interconnecting network 32 to called terminal 46. The characteristics of called customers, with respect to what kinds of collect calls they will accept, are stored in regional data base systems such as remote data base system 20 which contains data for called terminal 46. Other kinds of originating and terminating customer data are stored in local or remote data base systems as convenient. System 20 is queried before the connection to the called customer is being established. For this example call, the query indicates that the called customer will accept all collect calls but wishes to be informed that an incoming call is collect.

When called terminal 46 answers, the answer signal is transmitted back to switching network 12 and is passed to control 10 via control access 11. When control 10 receives this answer signal, control 10 sets up a connection in switching network 12 from automated position group 50 through interconnecting network 32 to called terminal 46 to announce to the called customer that this is a collect call. Since called customer 46 has agreed in advance to accept all collect calls, the call between calling terminal 42 and called terminal 46 may be set up through switching network 12 after this announcement has been received by the called customer. Note that this exemplary call has been established without requiring the services of an operator.

Customers may specify that they will accept all collect calls, that they wish to decide without further data whether or not to accept each collect call, that they want to know the name of the calling party and wish to decide for each call, or that they will accept no collect calls. Alternatively, an announcement to the called customer announcing a collect call could include the area code, the geographic locality, or the full directory number of the calling customer in order to supply the called customer with further call data that he can use in order to decide whether to accept the call, or could include a recording, made in the automated position group by the caller, of the caller's name.

In this specific embodiment, automated credit card calls are detected in parallel with other types of automated operator calls. This is in contrast with the present arrangements wherein card calls are detected first when a customer keys a calling card number in response to an initial "bong" tone. A disadvantage of this arrangement is that ACCS calls must be routed to an automated position thus utilizing the more expensive resources of an automated position instead of being connected to a DTMF detector. The advantage of the operation disclosed herein is that there is no need to wait for a timeout following the ACCS tone before attaching the automated position thereby providing faster service to customers for calls other than ACCS. An additional advantage is that the switch owner can modify the treatment of ACCS calls within the automated position without changing the control program of the switch.

Figure 2:
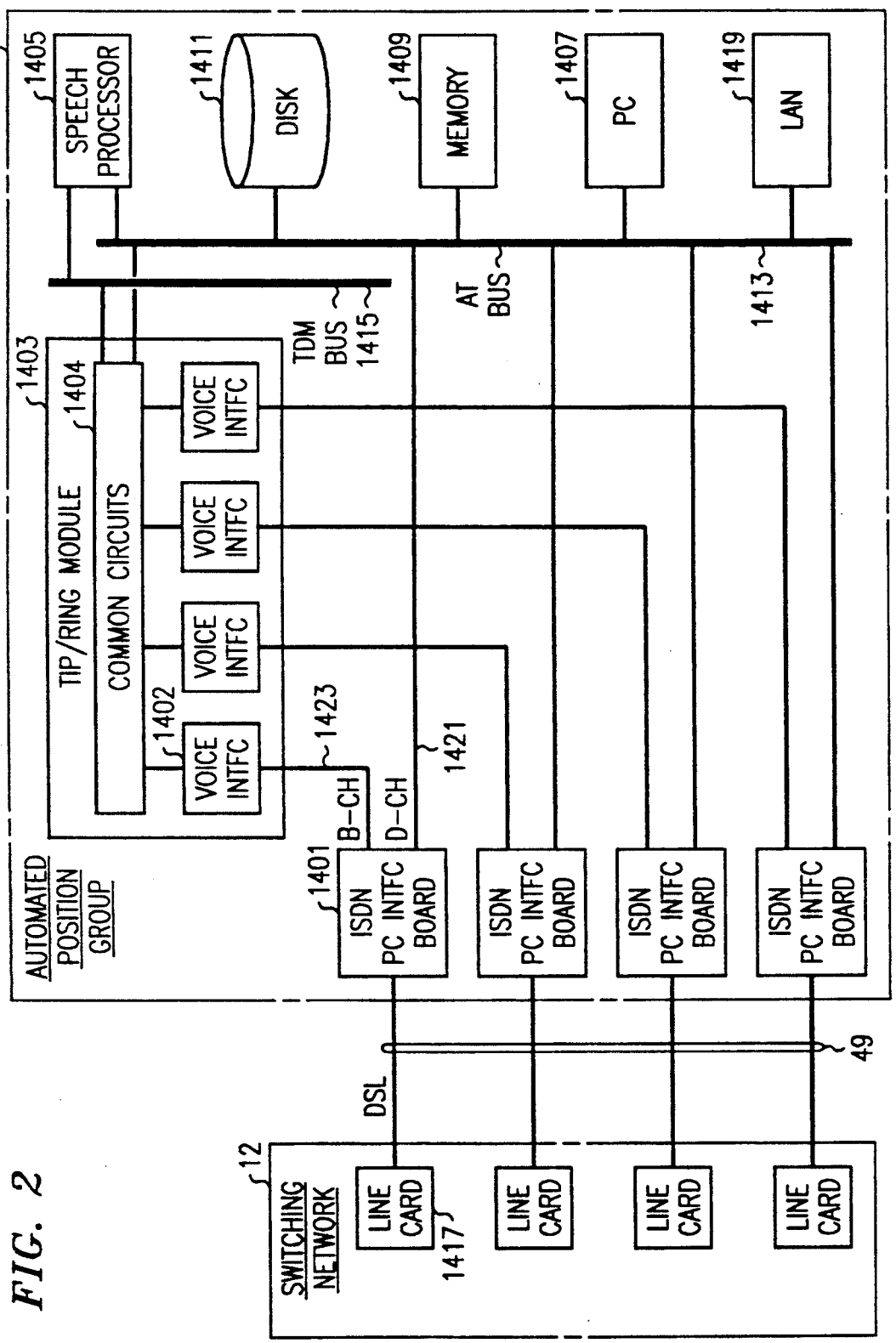
FIG. 2 is a block diagram of an automated position group.
Figure 3:
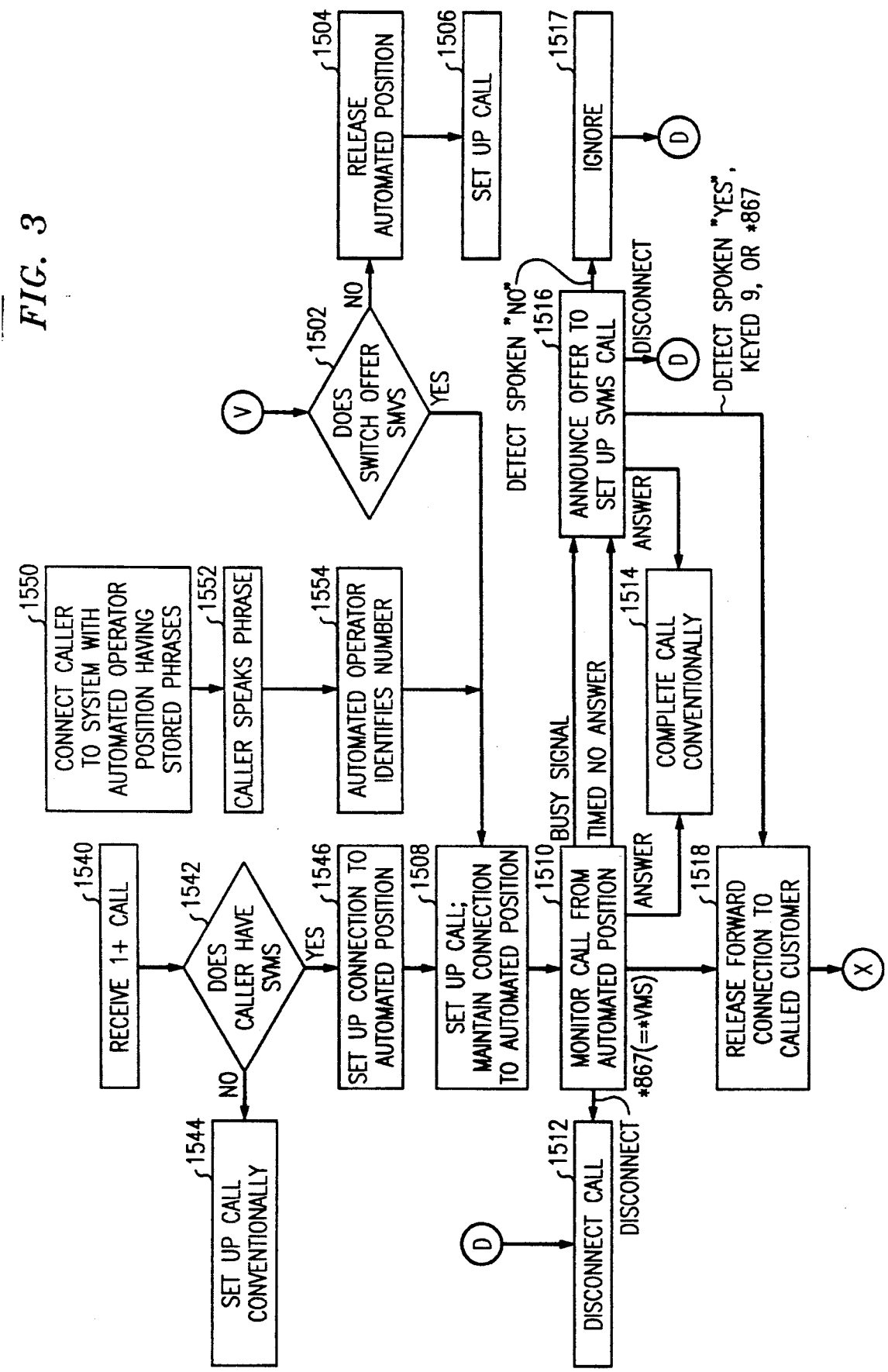
Figure 4:
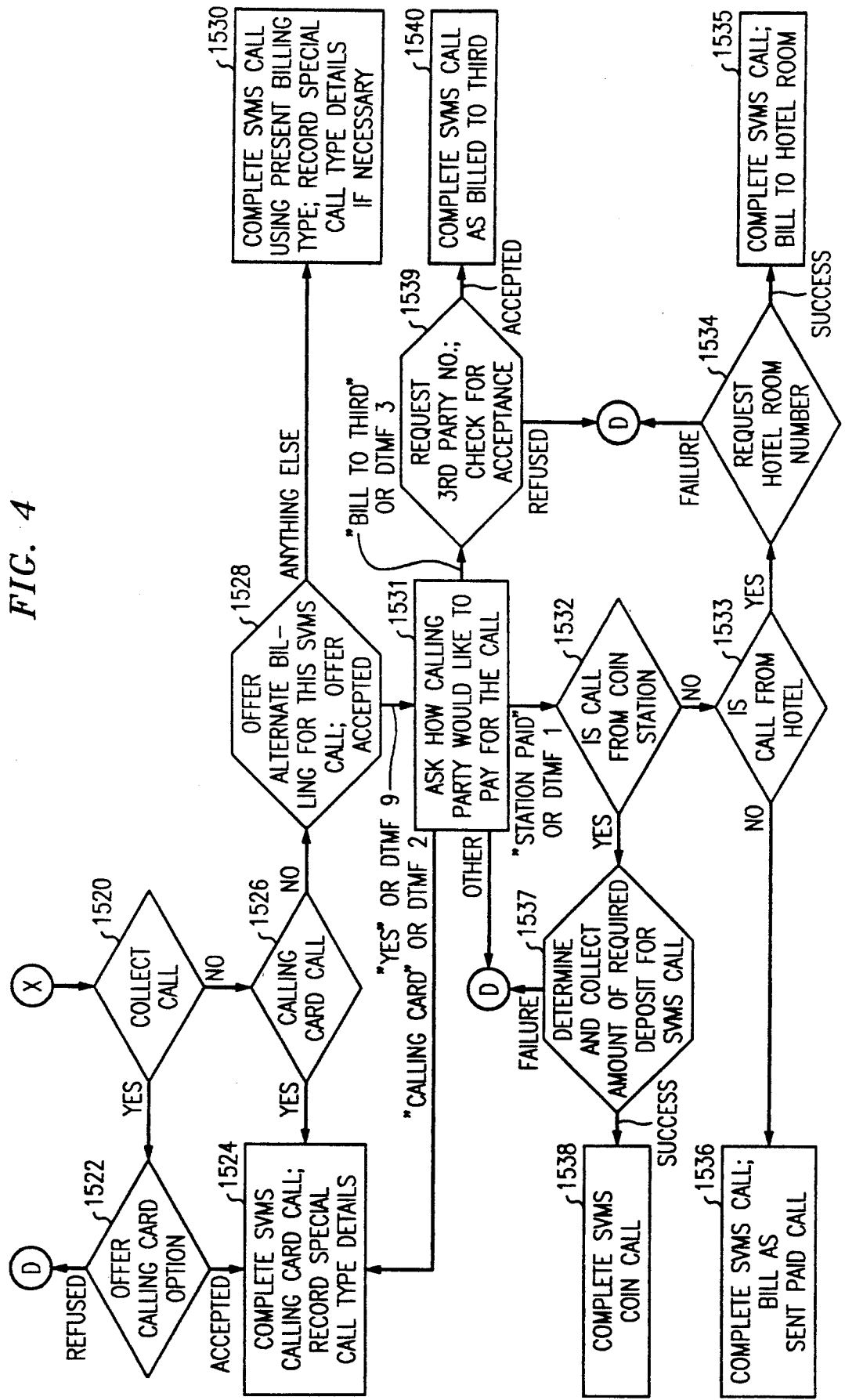

FIG. 2 is a block diagram of an automated position group 50. The automated position group is connected via four ISDN digital subscriber lines grouped into entity 49 to corresponding ISDN T-interface line cards 1417 in switching network 12 of the operator assistance switch. Each of these digital subscriber lines is terminated to an ISDN Personal computer Interface Board (IPIB) 1401. This personal computer interface board 1401 has as outputs both a D-channel output 1421 for conveying data messages between the switching network and the control equipment of the automated position group and a voice-channel output 1423 for communicating with an automated position TIP/RING (T/R) interface module 1403. The interface module 1403 includes common circuits 1404 for interfacing to the time division multiplex bus 1415 and to four individual voice interface circuits 1402 for interfacing with the B-channels of the four ISDN interface boards 1401. The T/R interface module 1403 reconverts the analog voice-channel output of the IPIB to a digital signal; provides a line-equivalent balancing network (in contrast to the IPIB which provides an operator position equivalent balancing network); and provides the equivalent of DTMF receivers for detecting DTMF. The B-channel carries voice signals and DTMF tones from the calling or called customers connected to the line card 1417. The TIP/RING interface module 1403 conveys voice signals to time division multiplex bus 1415 for communication to the speech processing board 1405. The speech processing (SP) board processes speech signals and communicates with personal computer 1407 over an Advanced Technology (a common PC state of the art) bus 1413. The SP provides announcements and prompts, and receives spoken input which it processes to recognize the words of that input. It is also used for recording a spoken name (for example, for collect calls) and applies speech recognition grammar rules. Bus 1413 is a 32 bit PC bus for communicating among the blocks connected thereto. Local Area Network (LAN) interface 1419 is used to control bus 1413. The speech processor board identifies the spoken input and passes this data to PC 1407 which applies additional grammar checks using a software data interface process. Memory 1409 is a PC expansion memory, a random a access memory (RAM) to provide adequate RAM for the PC. The disk 1411 is a standard PC disk used for storing system software, drivers, program, office data, and digitized announcement and prompting phrases. The PC communicates data messages over one of the D-channels 1421 to one of the line cards 1417 and receives messages from the operator assistance switch over the same D-channel. A particular call is associated with a particular D-channel and line card while being served. The messages that are exchanged over this D-channel are exactly the same messages as are used in communicating with an operator position staffed by a human being and used for controlling the display of that operator position and for sending data representing information keyed by the operator to the operator assistance switch.

The arrangements of FIGS. 1 and 2 can also be used to offer spontaneous voice message service. If these arrangements are used for this purpose then the call completion action blocks are augmented by the sequence of the actions shown in the flow diagram of FIGS. 3–4. The augmentation is to offer spontaneous voice messaging service in case the call cannot be completed because the called party is busy or does not answer.

Test 1502 is used to represent a test to check whether the switch offers spontaneous voice message service. In practice, such a test would not be required since if the switch did not offer spontaneous voice message service, the details of FIGS. 3–4 simply would not be implemented. However, to show the flow of actions, if the switch does not offer spontaneous voice message service, then the automated position is released (action block 1504) and the call is set up in the conventional way (action block 1506). If, however, the switch does offer spontaneous voice message service, then the call is set up but the connection to the automated position is maintained (action block 1508). The call being set up is monitored from the automated position (action block 1510). If a disconnect is detected the call is disconnected (action block 1512). If an answer is detected, the call is completed conventionally (action block 1514). If a busy signal is detected or a timed no-answer is detected, then an offer to set up a VMS call is announced to the caller (action block 1516) from the automated position (action block 1516). During the announcement, if an answer is detected then the call is completed conventionally (action block 1514). If a spoken "no" is detected, the spoken "no" is ignored (action block 1517) in order to allow the caller to wait for a possible answer and to detect a disconnect leading to the disconnection of the call (action block 1512) after the customer stops waiting. However, if the customer, after responding "no" to the VMS prompt, continues to wait for a possible answer and exceeds a specified time-out period, the caller will be prompted for a final time (i.e., 1516), if a "no" is detected, the call will be disconnected (i.e., 1512). If a spoken "yes", a keyed 9 (for y or yes) or a keyed *867 (equals *VMS) is detected, then the forward connection to the called customer is released (action block 1518). The same action is performed if the calling customer keys *867 prior to the time of a timed no-answer. Following action block 1518, a test is made to see if the call is a collect call (test 1520). It would be against telephone company policy to allow collect calls for voice message calls since the voice message recipient has no opportunity to deny the collect call. It is, of course, possible in the future that a check can be made to see if the called number accepts collect voice message calls in which case a positive result of such a test would be treated in this flow chart as the equivalent of a "no" on the collect call test. At any rate, if the output of test 1520 is positive, then an announcement is made to the caller to offer a calling card option (1522). If this offer is refused (as detected by a disconnect or the absence of a spoken "yes" or keyed 9) then call is disconnected. If the offer is accepted, then the call is completed as a VMS calling card call including obtaining the customer's calling card number. Further, details of special call types are entered in the record of the voice message call to prepare for the special call delivery option described with respect to FIG. 5. If the call was not a collect call, a test is made whether the call was a calling card call (test 1526). If so, then the actions of block 1524 excluding the actions of obtaining the calling card number are performed to complete this as a VMS calling card call.

If this was not a calling card call, then alternate billing is offered for this VMS call (test 1528). If the offer is accepted by the customer saying "yes" or keying a DTMF 9, then action block 1531 is executed. Otherwise, action block 1530 is executed and the VMS call is completed using the present type of billing. This action includes recording special call type details if necessary. Action block 1531 is an announcement asking how the calling party would like to pay for the call. If the calling party says "station paid" or keys DTMF 1, then test 1532 is executed. If the calling party says "calling card" or keys DTMF 2, then action block 1524, previously described, is executed. If the calling party says "bill to third" or keys DTMF 3, then action block 1539 is executed. Otherwise the call is disconnected (action block 1512). Action block 1539 requests the third party number and checks for acceptance. If the charge is accepted, then the SVMS call is completed as a bill to third party call (action block 1540). Otherwise, if the charge is rejected, the call is simply disconnected (action block 1512).

If, in response to the announcement of action block 1531, the customer stated "station paid" or keyed DTMF 1, then test 1532 is performed to check whether the call is from a coin station. If not, test 1533 is performed to check whether the call is from a hotel having individual room billing. If not, then the spontaneous VMS call is completed and billed as a sent paid call (action block 1536). If the call is from a hotel, then an announcement is made to request the hotel room number from the caller (action block 1534). If the room number is successfully obtained, then the SVMS call is completed as a bill to hotel room call (action block 1535). If the caller fails to supply the hotel room number, the call is simply disconnected (action block 1512).

If test 1532 determines that the call is from a coin station, then the amount of the charge for an SVMS is determined and the required deposit is requested. If the customer fails to deposit this amount of money then the call is disconnected (action block 1512). Otherwise, the call is completed as an SVMS coin call (action block 1538).

The calls which are established using the methods of this specification are voice calls, data calls and facsimile calls.

An additional service which can be offered using the facilities of an automated operator is the following. Customers are assigned a specific individual telephone number which may be a number in the 1-700, 1-800, or 1-900 block which will be routed to a switching system containing prerecorded phrases in the voice of that customer. These phrases might be phrases such as: "Mom," "Broker," "Office," "Home," "Secretary," "Bob," "Betty," etc. The customer would dial his or her personal number, would be connected to this switching system and the switching system would select the prerecorded phrases based on that customer's specific number. Then, when the customer speaks, one of the prerecorded phrases, the automated operator system would match that phrase against one of the prerecorded phrases to determine the destination desired by the customer. Once that destination has been determined, the directory number of that destination is found and the call is completed to that directory number. Subsequently, if the call is to a busy telephone or is not answered spontaneous voice message service can be invoked. These actions are described with respect to blocks 1550, 1552, and 1554. Block 1550 indicates that when the customer dials this personal number, that caller is connected to a system having an automatic operator that contains the stored phrases of that customer and the customer is connected to such an automated operator (action block 1550). The customer speaks the phrase identifying the destination (action block 1552) and the automated operator identifies the number associated with that phrase (action block 1554). Thereafter, the call is set up and monitored for a possible SVMS request (action block 1508 et seq.).

Figure 5:
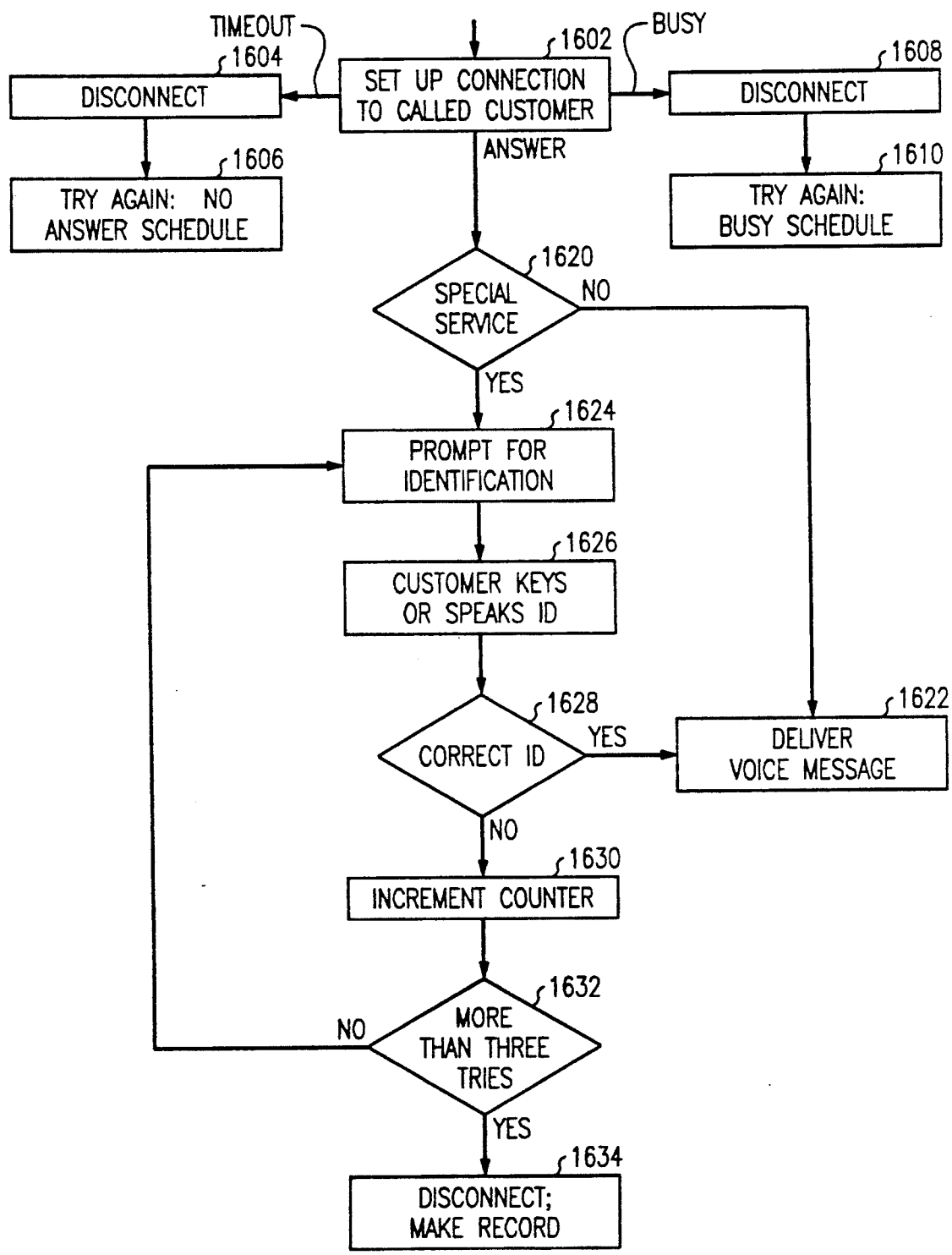

FIG. 5 is a description of call delivery from a voice message system or from an automated position for providing voice message service as described herein. A previously recorded message is considered for delivery to the called customer by first setting up a connection to the called customer (action block 1602). Such attempts are made according to scheduling algorithms which are well known in the art and are described, for example, in Phoneplus (magazine), Jun. 1990, pages 35–39. If there is a time out with no answer, the call is disconnected (action block 1604) and another attempt will be made according to the previous history of delivery for that call as amended by the fact that there has been no answer detected (action block 1606). If a busy signal is detected, then the call is disconnected (action block 1608) and another attempt based on the schedule of having encountered a busy signal is tried later (action block 1610). If an answer is detected, then a test 1620 is performed to detect whether this is a special service call. If not, the voice message is delivered (action block 1622). If so, the called customer is prompted for an identification. This prompt may be proceeded by an identification of the destination customer (action block 1624). If the customer speaks or keys the proper identification which is a personal identification number (action block 1626), test 1628 checks whether the identification is correct. If so, the voice message is delivered (action block 1622). If not, a counter is incremented (action block 1630) and a test 1632 is made whether the identification has been keyed more than three times. If so, the call is disconnected and a record is made that someone is trying to access the voice message. If not, the called customer is given another chance to key the correct identification. This kind of service can be provided by giving the called customer a 700 number and recording in the database for that 700 number, the POTS directory of that customer so that the call can be completed if the customer is available and by storing the customer's personal identification number. If a caller wishes to leave a voice message and does not wish to try to complete the call, then the caller can simply press *867 immediately after dialing in order to request the voice message service. Advantageously, such an arrangement ensures that private messages are delivered only to the appropriate recipient.

This arrangement can also be used for setting up 1+calls, (i.e., calls which are not of an operator assistance type). If such a call is received in switch 1 (action block 1540, FIG. 3), then test 1542 determines whether the caller has SVMS service. This test is performed as described in U.S. Pat. No. 4,932,042 by querying the translation database of switch 1 to determine whether the customer has that service. In some cases, a telephone operating company will choose to offer the service to all customers. The customer is identified by an automatic number identification forwarded from the end office connected to the customer or is simply identified by the location on the switch if the switch is an end office for that customer. If the caller does not have SVMS the call is set up conventionally (action block 1544) but if the caller does have SVMS then a connection is set up to an automated position for monitoring the call (action block 1546) and thereafter the actions described above with respect to action block 1508 et seq. are performed.

By equipping the automated position group 50 with an appropriate program in its PC 1407, voice message service can be provided from the automated position group and further the additional program to provide spontaneous voice message service can also be provided from PC 1407. Disk 1411 is used for storing voice messages and speech processor 1405 can be used for recognizing speech (such as spoken numbers and "yes" and "no") for detecting dual tone multifrequency (DTMF) signals keyed by customers and for detecting busy tone and answer signals as received from a called switch. The programs for controlling voice message service are well known in the art. The programs for controlling spontaneous voice message service have been described herein and for providing spontaneous voice message service on non-operator calls from another switch have been described in U.S. Pat. No. 4,932,042. Alternatively, centralized voice message service can be utilized in conjunction with the principles of this invention by switching a call to a centralized voice message system at the time that a decision has been made to complete a VMS call (action block 1524 or action block 1530 of FIG. 4). These action blocks would simply be replaced by an action block to set up a connection to a voice message center and to forward to that voice message center the accumulated records for the call. The voice message center can effect delivery including the delivery of special service calls in the same way as the automated position group adapted to provide spontaneous voice message service. A third option is to provide a voice messaging system 52 (FIG. 1) attached to the operator switch.

It may be desirable to provide a number of specialized automated position groups having a large amount of disk space available to provide voice message service while the rest of the automated position groups are primarily dedicated to handling operator functions. If this decision is made, then at the time when a decision is made to set up a voice message call the call is rerouted to one of these specialists automated position groups: this specialist automated position group then also performs the message delivery function of FIG. 5.

FIG. 6 is a flowchart of the method for allowing subscribers to prerecord phrases for subsequent recognition by an automated operator as described with respect to block 1550 et seq. The subscriber dials a special directory change number, presumably an 800 number, which gives that subscriber and all other subscribers served from the automated position group in which the subscriber phrases are stored, the recognition capabilities for recognizing that subscriber's phrases (action block 1702). The subscriber is prompted for the outbound number that is dedicated to that subscriber for the service (the 700, 800, or 900 number assigned to that customer) (action block 1704). The subscriber enters the appropriate outbound number via DTMF (action block 1706). The subscriber is then prompted for a personal identification number to make sure that only the authorized subscriber can change the list (action block 1708). The subscriber enters the personal identification number via DTMF (action block 1710). Assuming that the personal identification number is correct (if it is not correct the subscriber may be re-prompted and subsequently be disconnected), the subscriber is asked if he/she wishes to add or delete an entry or quit (action block 1712). The subscriber speaks a choice (action block 1714). If the choice is "quit", then the call is disconnected (action block 1750).

If the choice is "add", then the subscriber is prompted to enter the phone number of the new party by DTMF (action block 1716). The customer is then asked to speak the identity of the client three times (action blocks 1718, 1720, 1722). The entry is then added to the subscriber's list (action block 1724), and action block 1712 is reentered.

If the subscriber speaks the word "delete", then the subscriber is prompted to speak the identity of the entry to be deleted (action block 1730). Test 1732 is used to check whether the identity is recognized. If the identity is recognized, then the entry is deleted and an announcement to that effect is made (action block 1734), a count (discussed hereinafter with respect to action blocks 1736 and 1738) is reset, and action block 1712 is reentered. If the identity is not recognized, then a count is incremented (action block 1736) and test 1738 is performed to determine whether the count is still less than three. If so, then action block 1730 is entered; if not, action block 1712 is entered.

The above description is considered to be only an illustrative embodiment of the invention. Other alternatives are possible without departing from the scope of the invention. For example, a service to the handicapped may be offered by asking them to speak an identifying command followed by a spoken directory number to allow them to set up standard, normally dialed, calls. Further, it is possible to have many different tradeoffs between what is recognized by automatic voice processing techniques and what is recognized only by use of an operator. Prompting tones and prompting announcements can be selected based on experience in human factors tests and can be changed as customers become more sophisticated. It is to be understood that various and numerous other arrangements may be devised by one skilled in the art without departing from the scope of the invention. The invention is thus limited only as defined in the accompanying claims.

We claim:

1. In a switching system for connection to an attended operator position, a method of establishing a call comprising the steps of:
   responsive to receiving a number for identifying a calling customer, establishing a connection from said switching system to means for recognizing spoken commands for the identified calling customer;
   recognizing a spoken command from said calling customer for identifying a number of a called customer corresponding to said spoken command of said calling customer, said spoken command being individual to said calling customer; and
   establishing a call to a telephone station identified by said identified number;
   wherein said means for recognizing spoken commands communicate with said switching system by data messages essentially identical to data messages for communicating with said attended operator position.

2. The method of claim 1 further comprising the steps of:
   prior to said establishing a connection, recording spoken commands and corresponding telephone numbers for said customer, for subsequent use in said recognizing step, in response to receiving another call from said customer.

3. The method of claim 2 wherein establishment of said another call comprises receiving a number for identifying said calling customer and a personal identification number for authenticating said call.

4. The method of claim 2 wherein said recording comprises receiving telephone numbers as a series of dual tone multifrequency (DTMF) signals.

5. The method of claim 1 wherein said number for identifying a calling customer is dialed into a first switching system for subsequent transmission to a second switching system comprising said means for recognizing.

6. The method of claim 1 when said means for recognizing spoken commands comprise speaker dependent means for recognizing said spoken commands.

7. A method of establishing a call comprising the steps of:
   responsive to receiving a number for identifying a calling customer, establishing a connection to means for recognizing spoken commands for the identified calling customer;
   recognizing a spoken command from said calling customer for identifying a number of a called customer corresponding to said spoken command of said calling customer, said spoken command being individual to said calling customer; and
   establishing a call to a telephone station identified by said identified number;
   wherein the step of establishing a connection is executed in a switching system having a switching network with a plurality of ports for connection to an operator position and control means for controlling said network and wherein the step of establishing a connection comprises the step of establishing a connection to automated operator position means for recognizing said spoken commands and wherein the step of establishing a call comprises transmitting a message from said automated operator position means to said control means, said message being essentially the same as a message from an attended operator position, for establishing said call.

8. The method of claim 7 further comprising the steps of:
   prior to said establishing a connection, recording spoken commands and corresponding telephone numbers for said customer, for subsequent use in said recognizing step, in response to receiving another call from said customer.

9. The method of claim 8 wherein establishment of said another call comprises receiving a number for identifying said calling customer and a personal identification number for authenticating said call.

10. The method of claim 8 wherein said recording comprises receiving telephone numbers as a series of dual tone multifrequency (DTMF) signals.

11. The method of claim 7 wherein said number for identifying a calling customer is dialed into a first switching system for subsequent transmission to a second switching system comprising said means for recognizing.

* * * * *

UNITED STATES PATENT AND TRADEMARK OFFICE
CERTIFICATE OF CORRECTION

PATENT NO. : 5,181,237
DATED : Jan. 19, 1993
INVENTOR(S) : Douglas C. Dowden, et al It is certified that error appears in the above-indentified patent and that said Letters Patent is hereby corrected as shown below:

Item [57]

Abstract page, right column, line 14 of the Abstract, after "a call to an" delete "automated" and substitute --attended operator--.

Signed and Sealed this

Twenty-first Day of May, 1996

Attest:

BRUCE LEHMAN

Attesting Officer    Commissioner of Patents and Trademarks